Patented July 22, 1941

2,249,950

UNITED STATES PATENT OFFICE 2,249,950

METHOD OF PREPARING LINEAR POLY-ESTERS

Calvin S. Fuller, Chatham, N. J., assignor to Bell Telephone Laboratories, Incorporated, New York, N. Y., a corporation of New York No Drawing. Application May 28, 1938,
Serial No. 210,677

8 Claims. (Cl. 260—75)

This invention relates to linear polyesters and more particularly to a method of efficiently and economically preparing linear polyesters having exceptionally high molecular weights.

When certain linear polyesters or the ingredients for preparing these polyesters such as dicarboxylic acids and dihydric alcohols are heated together polymers having long linear molecules are formed. These latter substances when prepared under proper conditions are characterized by elasticity, solubility in certain organic solvents and great toughness. These valuable properties make this class of compounds especially adapted for use as insulating materials in electrical apparatus.

Various methods have heretofore been proposed for preparing linear polyesters having average molecular weights above approximately 3,000 as determined by viscosity methods. The rate of reaction in the preparation of the polyesters by these methods has been extremely slow and while some reagents have been suggested for accelerating the reaction, the resulting product is contaminated to some extent as a consequence of side reactions which often produce dark colored substances.

In accordance with this invention, polyesters having relatively high average molecular weights and which are substantially uncontaminated are prepared in a short period of time by heating direactive organic compounds capable of undergoing esterification reaction such as an hydroxy acid or a mixture of a dicarboxylic acid and a dihydric alcohol, in the presence of a catalyst selected from the group which consists of salts of alkaline earth or heavy metals with strong acids, acid salts of strong acids and aliphatic esters of strong acids. The reacting groups of the hydroxy acid to which the invention is applicable are separated by more than three carbon atoms, while the reacting groups of the dicarboxylic acid and dihydric alcohols are separated so that in the following repeating unit of the ester $n_1$ is greater than 1 and $n_2$ is zero or greater than zero.

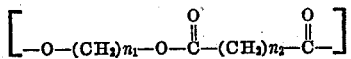

Copolyesters may also be prepared in the presence of the catalyst from a mixture of a plurality of dicarboxylic acids and a dihydric alcohol or a mixture of a dicarboxylic acid and a plurality of dihydric alcohols or a mixture of a plurality of dicarboxylic acids and a plurality of dihydric alcohols. The limitation in regard to the number of carbon atoms between active groups in the repeating unit present in the copolyesters is the same as that given above in the case of polyesters. The hydroxy acid or the mixture of a dicarboxylic acid and a dihydric alcohol or products resulting from the partial condensation of these materials are heated in the presence of the catalyst in a stream of inert gas such as hydrogen which is substantially free of oxygen. The concentration of the catalyst should be preferably less than 1 per cent and it is desirable to have the concentration less than one-tenth of 1 per cent of the total weight of the reacting compound. However, polyesters have been prepared with the amount of catalysts as high as 5 per cent.

The condensation reaction in the preparation of the polyesters occurs at an increasing rate as the temperature is raised. In most instances the reaction is too slow to be of practical value below 150° C. The upper limit at which the compounds can be produced is determined by the temperature at which thermal decomposition occurs. For example, satisfactory polyesters have been obtained with temperature as high as 275° C.

The method in accordance with this invention is conveniently performed by forcing pure dry hydrogen gas through the mixed reactants employed for forming the polyester or through a polymer of the ester of low molecular weight. In order to prevent oxidation at elevated temperatures, it is desirable that the condensation take place in an atmosphere of an inert gas which does not contain more than one-tenth of 1 per cent by volume, as measured at standard temperature and pressure, of oxygen. This amount of oxygen is critical in that, if exceeded, thermal decomposition is accelerated, discolored products result and in certain cases the entire course of the condensation reaction is deleteriously affected. Hydrogen is preferable since not only is it a reducing agent, but it permits the reaction to take place at a faster rate. A small quantity of the catalyst preferably less than one-tenth of 1 per cent is placed in the flask or other container before subjecting the reactants or polymer to an elevated temperature. The hydrogen is freed from all traces of oxygen and water by passing it over heated copper gauze before introducing it into the flask or other chamber in which the reactants are contained. Polyesters of average molecular weight exceeding 15,000 as determined by viscosity measurements may be prepared from dicarboxylic acids and dihydric alcohol by this method in a small fraction of the time required to obtain the same average molecular weight in the methods heretofore employed. For example, polyethylene sebacate may be prepared in eighteen hours with the aid of a catalyst, whereas to prepare the same polyester having substantially identical molecular weight requires eight days without a catalyst. The catalysts employed in accordance with this invention may be used in other methods for preparing linear polyesters such, for example, as the molecular distillation process disclosed in U. S. 2,071,250, granted to W. H. Carothers on February 16, 1937.

Examples of the salts of heavy metals which may be employed as catalysts in this method are the halides, sulphates, phosphates, pyrophosphates and chloracetates of zinc, cadmium, magnesium, aluminum and copper. The salts of the alkaline earth metals are preferably calcium, barium and strontium halides, phosphates and sulphates. Typical examples of the acid salts are sodium hydrogen sulphate and potassium monobasic phosphate and those of the aliphatic esters of strong acids are dimethyl sulphate and dipropyl phosphate. Salts which are very soluble in water are preferred as catalysts. The use of oxidizing salts or esters such as the nitrates and perchlorates would be unsatisfactory since oxygen would be introduced into the reacting mixture.

The following are examples which are typical of the method in accordance with this invention:

Example 1

One-quarter mol of sebacic acid is heated with 0.27 mol of ethylene glycol at 200°±5° C. in the presence of 0.05 gram of calcium chloride and a stream of hydrogen gas previously purified by passage over heated copper gauze is bubbled through the mixture. The reaction is continued in this manner for approximately 18 hours. At the end of this time the product has the property of cold drawing into strong, flexible threads. The intrinsic viscosity $$\left(\log_{10} \text{ of } \frac{V}{C}\right.$$

where $V$ is the relative viscosity and $C$ is the concentration in grams per litre) is greater than 0.5. The product is purified by solution in chloroform and precipitated with petroleum ether. The mass is finally washed in hot water and dried.

The material so purified forms an extremely tough mass which softens at approximately 74° C. The material has a dielectric constant of 4.02 at 2 kilocycles and a power factor of 0.0033.

Example 2

One-tenth mol of decamethylene glycol is reacted with one-tenth mol of succinic acid in the presence of 0.01 gram of zinc chloride at 210±5° C. A stream of nitrogen gas previously purified by passing over copper heated to redness is bubbled continuously through the mixture during reaction. After 24 hours the product is readily cold drawn to give strong fibres which furnish sharp X-ray fibre diagrams.

Example 3

One-fifth mol of suberic acid is reacted according to the method employed in Example No. 1 with one-fifth mol of ethylene glycol except that 0.1 gram of sodium hydrogen sulphate is used as a catalyst instead of the calcium chloride. The product obtained after 24 hours is extremely tough and can be cold drawn into highly oriented threads.

Example 4

One-quarter mol of azelaic acid is heated in a suitable vessel at 200°±5° C. with one-quarter mol of trimethylene glycol. 0.1 gram of aluminum chloride is added to the mixture as a catalyst. After 18 hours reaction in a stream of pure hydrogen gas, a tough mass is obtained which is readily cold drawn to give strong, pliable threads.

Example 5

One-quarter mol of ethylene glycol is reacted with one-quarter mol of succinic acid according to the method of Example No. 1 except that 0.1 gram of iron chloride is employed as a catalyst. After 48 hours reaction a tough mass of polymeric ester is obtained.

Example 6

One-fifth mol of suberic acid and one-fifth mol of ethylene glycol are heated together under the conditions described in Example No. 1 except that 0.1 gram of diethyl sulphate is employed as the catalyst. After 24 hours an extremely tough product is obtained.

Example 7

One-quarter mol of ethylene glycol, one-quarter mol of trimethylene glycol and one-half mol of succinic acid are heated in a container at 200°±5° C. in the presence of .2 gram of zinc chloride and hydrogen is bubbled through the reacting mixture. After 24 hours a tough copolyester results which may be purified in accordance with the procedure outlined in Example 1.

Example 8

One-half mol of ethylene glycol is reacted with one-quarter mol of glutaric acid and one-quarter mol of sebacic acid in the presence of .25 grams of strontium bromide at a temperature of 200°±5° C. The reaction is conducted in an atmosphere of hydrogen. In 24 hours a product is found which is pliable and strong.

While preferred embodiments of the method in accordance with this invention have been described, various modifications may be made therein without departing from the scope of the appended claims.

What is claimed is:

1. The method of preparing a linear polyester of high molecular weight comprising continuing the esterification of a lower molecular weight linear polyester identical with the polyester produced by the esterification of at least one dihydric alcohol having the following formula in which $n_1$ is greater than 1:

$$HO-(CH_2)_{n_1}-OH$$

with at least one dicarboxylic acid having the following formula in which $n_2$ is zero or greater than zero:

$$COOH-(CH_2)_{n_2}-COOH$$

in the presence of a non-oxidizing salt of a heavy metal with a strong mineral acid until a linear polyester is formed having a molecular weight sufficiently high to impart the property of cold drawing.

2. The method of preparing a linear polyester of high molecular weight comprising continuing the esterification of a lower molecular weight linear polyester produced by the esterification of at least one dihydric alcohol having the following formula in which $n_1$ is greater than 1:

$$HO-(CH_2)_{n_1}-OH$$

with at least one dicarboxylic acid having the following formula in which $n_2$ is zero or greater than zero:

$$COOH-(CH_2)_{n_2}-COOH$$

in the presence of a non-oxidizing salt of zinc with a strong mineral acid until a linear polyester is formed having a molecular weight sufficiently high to impart the property of cold drawing.

3. The method of preparing a linear polyester of high molecular weight comprising continuing the esterification of a lower molecular weight linear polyester produced by the esterification of at least one dihydric alcohol having the following formula in which $n_1$ is greater than 1:

$$HO-(CH_2)_{n_1}-OH$$

with at least one dicarboxylic acid having the following formula in which $n_2$ is zero or greater than zero:

$$COOH-(CH_2)_{n_2}-COOH$$

in the presence of a halide of a heavy metal until a linear polyester is formed having a molecular weight sufficiently high to impart the property of cold drawing.

4. The method of preparing a linear polyester of high molecular weight comprising continuing the esterification of a lower molecular weight linear polyester produced by the esterification of at least one dihydric alcohol having the following formula in which $n_1$ is greater than 1:

$$HO-(CH_2)_{n_1}-OH$$

with at least one dicarboxylic acid having the following formula in which $n_2$ is zero or greater than zero:

$$COOH-(CH_2)_{n_2}-COOH$$

in the presence of a chloride of a heavy metal until a linear polyester is formed having a molecular weight sufficiently high to impart the property of cold drawing.

5. The method of preparing a linear polyester of high molecular weight comprising continuing the esterification of a lower molecular weight linear polyester produced by the esterification of at least one dihydric alcohol having the following formula in which $n_1$ is greater than 1:

$$HO-(CH_2)_{n_1}-OH$$

with at least one dicarboxylic acid having the following formula in which $n_2$ is zero or greater than zero:

$$COOH-(CH_2)_{n_2}-COOH$$

in the presence of a zinc halide until a linear polyester is formed having a molecular weight sufficiently high to impart the property of cold drawing.

6. The method of preparing a linear polyester of high molecular weight comprising continuing the esterification of a lower molecular weight linear polyester produced by the esterification of at least one dihydric alcohol having the following formula in which $n_1$ is greater than 1:

$$HO-(CH_2)_{n_1}-OH$$

with at least one dicarboxylic acid having the following formula in which $n_2$ is zero or greater than zero:

$$COOH-(CH_2)_{n_2}-COOH$$

in the presence of zinc chloride until a linear polyester is formed having a molecular weight sufficiently high to impart the property of cold drawing.

7. The method of preparing polyethylene succinate of high molecular weight comprising continuing the esterification of polyethylene succinate of lower molecular weight by bubbling dry oxygen-free hydrogen therethrough at an elevated temperature in the presence of a catalyst comprising a chloride of a heavy metal until a linear polyester is formed having a molecular weight sufficiently high to impart the property of cold drawing.

8. The method of preparing a linear polyester of high molecular weight comprising continuing the esterification of a lower molecular weight linear polyester identical with the polyester produced by the esterification of at least one dihydric alcohol having the following formula in which $n_1$ is greater than 1:

$$HO-(CH_2)_{n_1}-OH$$

with at least one dicarboxylic acid having the following formula in which $n_2$ is zero or greater than zero:

$$COOH-(CH_2)_{n_2}-COOH$$

in the presence of a non-oxidizing catalyst selected from the group consisting of salts of heavy metals with strong acids, salts of alkaline earth metals with strong acids, acid salts of strong acids and aliphatic esters of strong acids until a polyester is formed having a molecular weight sufficiently high to impart the property of cold drawing.

CALVIN S. FULLER.